US007361417B2

(12) United States Patent
Kang et al.

(10) Patent No.: US 7,361,417 B2
(45) Date of Patent: Apr. 22, 2008

(54) PHOSPHOR LAYER, IMAGE DISPLAY DEVICE EMPLOYING THE SAME AND METHOD FOR MAKING THE PHOSPHOR LAYER

(75) Inventors: Byung-Heun Kang, Busan-si (KR); Jong-Sang Lee, Suwon-si (KR); Jae-Hong Lim, Ulsan-si (KR); Seok-Hwan Cha, Ulsan-si (KR); Hong-Kyu Choi, Busan-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 263 days.

(21) Appl. No.: 10/837,606

(22) Filed: May 4, 2004

(65) Prior Publication Data

US 2004/0224187 A1 Nov. 11, 2004

(30) Foreign Application Priority Data

May 7, 2003 (KR) ..................... 10-2003-0028868

(51) Int. Cl.
*H01J 29/18* (2006.01)

(52) U.S. Cl. ..................... 428/690; 313/461; 313/462; 313/463; 313/464; 313/465; 313/466; 313/467; 313/468; 313/469; 313/470; 313/471; 313/472; 313/473; 313/485; 313/487

(58) Field of Classification Search ........... 252/301.36; 313/461, 485, 487
See application file for complete search history.

(56) References Cited

U.S. PATENT DOCUMENTS

| | | | |
|---|---|---|---|
| 4,268,594 | A * | 5/1981 | Gesswein et al. ............. 430/24 |
| 4,425,528 | A * | 1/1984 | Watanabe ................... 313/466 |
| 4,602,156 | A | 7/1986 | Asai et al. |
| 5,077,088 | A | 12/1991 | Jeong |
| 5,213,894 | A | 5/1993 | Kim |
| 5,246,781 | A | 9/1993 | Jeong |
| 5,369,331 | A | 11/1994 | Mizukami et al. |
| 5,641,583 | A | 6/1997 | Bringley et al. |
| 5,932,140 | A | 8/1999 | Yu |
| 5,936,339 | A | 8/1999 | Hayama et al. |
| 6,417,611 | B1 | 7/2002 | Picht et al. |
| 6,572,786 | B2 | 6/2003 | Kawatsu et al. |
| 2002/0079815 | A1 | 6/2002 | Matsudate |
| 2003/0134087 | A1 | 7/2003 | Joly et al. |
| 2003/0224127 | A1 | 12/2003 | Burch et al. |

* cited by examiner

*Primary Examiner*—C. Melissa Koslow
(74) *Attorney, Agent, or Firm*—Robert E. Bushnell, Esq.

(57) ABSTRACT

A phosphor layer having improved contrast and brightness characteristics and a display device including the same are provided. The phosphor layer is made out of an ultra-fine pigment, a dispersant, a phosphor, a photosensitizer and a binder. The phosphor has a uniform distribution along the thickness of the phosphor layer, and the pigment varies in content over the thickness of the phosphor layer. A method of forming the phosphor layer is based on existing phosphor layer processes and includes a reduced number of processing steps than a filter screen method, thereby markedly lowering the manufacturing costs. The phosphor layer can be used in a cathode ray tube, a plasma display panel, a field emission display, and an organic electroluminescent device.

8 Claims, 3 Drawing Sheets

PHOSPHOR LAYER, IMAGE DISPLAY DEVICE EMPLOYING THE SAME AND METHOD FOR MAKING THE PHOSPHOR LAYER

CLAIM OF PRIORITY

This application makes reference to, incorporates the same herein, and claim all benefits accruing under 35 U.S.C. § 119 from an application for PHOSPHOR LAYER AND IMAGE DISPLAY DEVICE EMPLOYING THE SAME earlier filed in the Korean Intellectual Property Office on 7 May 2003 and there duly assigned Serial No. 2003-28868.

BACKGROUND OF THE INVENTION

1. Field of the Invention

The present invention pertains to a novel phosphor layer and an image display device employing the novel phosphor layer and methods for making the novel phosphor layer, and more particularly, to a phosphor layer having improved contrast characteristics and a display device employing the phosphor layer having the improved contrast characteristics.

2. Description of the Related Art

Presently, as industrial society advances, there is a need for high brightness and improved and refined designs and display characteristics for cathode ray tube (CRT) displays. In order to respond to this need, there have been efforts to improve light intensity influenced by electron beams and reduce reflectivity of external light on CRT displays. What is needed is a new design for a phosphor layer in a CRT, a new design for the CRT using a novel phosphor layer and a new, inexpensive method of making a phosphor layer that improves image quality.

SUMMARY OF THE INVENTION

It is therefore an object of the present invention to provide an improved CRT display.

It is also an object of the present invention to provide a design for a CRT display and a design for a phosphor layer used in the CRT display that is both inexpensive to manufacture and produces superior image quality.

It is yet another object of the present invention to provide novel methods of making the novel phosphor layer of the present invention.

It is further an object of the present invention to provide a novel phosphor layer used in displays that uses pigment particles to provide an improved image quality and improved image contrast.

It is still an object of the present invention to provide a novel phosphor layer containing pigment particles where the concentration of pigment particles in the phosphor layer drops off with increased distance from the supporting face plate.

It is yet another object of the present invention to provide methods for making the novel phosphor layer and the display containing the novel phosphor layer that are inexpensive to implement and produce the reduced concentration of pigment particle concentration with increased distance from the face plate.

These and other objects can be achieved by providing a phosphor layer for a CRT that made up of an ultra-fine pigment, a dispersant, a phosphor, a photosensitizer, and a binder. The phosphor layer is formed on a face plate and has a uniform thickness. The pigment has a concentration distribution in a thickness direction. The concentration of pigment in the phosphor layer preferably decreases with distance away from the supporting face plate. In other words, the phosphor layer is formed so that the concentration of pigment has a gradient in the thickness direction. According to another aspect of the present invention, there is provided an image display device including the above-described phosphor layer.

According to another aspect of the present invention, there is provided a method of forming the phosphor layer having the above pigment concentration gradient. The method includes first preparing a pigment dispersion by mixing an ultra-fine pigment, a dispersant, and a solvent together. Then, the pigment dispersion is mixed with a photosensitizer and a binder to form the phosphor layer. The composition for forming the phosphor layer is applied to an upper surface of a substrate and is then patterned by exposing and developing this applied phosphor layer. Alternatively, the composition is printed onto the upper surface of the substrate to form a patterned layer instead of the exposing and developing

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Turning now to the figures, a structure of a phosphor layer of a color cathode ray tube is described and illustrated with reference to FIG. 1. On an internal (or upper) surface of a faceplate (or substrate) 11 of a color cathode ray tube (or CRT) of FIG. 1, a patterned black matrix layer 12 is formed. The black matrix layer 12 is patterned to be present at regular intervals in order to absorb external light from reflecting off the CRT. Also, on the same internal surface of the faceplate 11, phosphor layers 13*a*, 13*b*, and 13*c* are formed and emit light of different colors when an electron beam impinges upon these phosphor layers that are formed between the intervals of the patterned black matrix layer 12.

Figure 1:
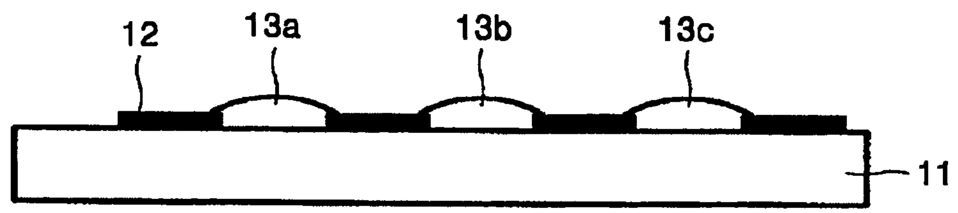
FIG. 1 is a sectional view of a phosphor layer in a CRT.
Figure 2:
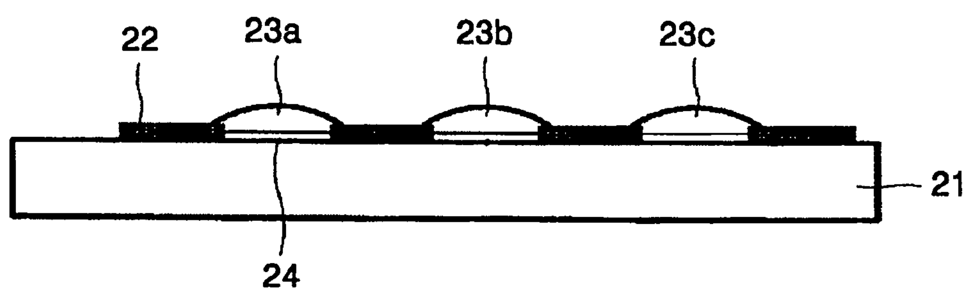
FIG. 2 is a sectional view of a phosphor layer for a CRT, the phosphor layer having a filter layer.

In an attempt to improve on the display structure of FIG. 1, two possible scenarios, identified as scenario (A) and scenario (B), are possible. As a method to prevent reflectivity of a phosphor layer formed on the internal surface of a faceplate 11 from reducing and to improve contrast and brightness of the phosphor layer, either by (A) coating a micro sized pigment on a phosphor surface or (B) by using a filter screen method of forming a filter layer 24 between a faceplate 21 and phosphor layers 23*a*, 23*b*, and 23*c* can be employed. FIG. 2 illustrates a scenario (B) that makes use of a filter layer 24 between faceplate 21 and phosphor layers 23*a*, 23*b* and 23*c*. In FIG. 2, reference numeral 22 is a patterned black matrix.

A method of making display of scenario (A) by coating a micro sized pigment on a phosphor surface is easy to practice. Also, image contrast improves in proportion to the amount of a pigment used in the coating. However, when an excess of pigment is used, the coated pigment may fall off in the manufacturing process.

On the other hand, in the method of making display of scenario (B) of FIG. 2 by forming a filter layer, improvements in contrast, brightness, and the like are distinct. However, this method of forming the filter layer of FIG. 2 is complicated and is expensive to make.

An embodiment of a method of manufacturing a phosphor layer for a cathode ray tube (CRT) in accordance with the present invention will now be described in detail. First, a pigment dispersion is prepared by mixing ultra-fine pigment particles, a dispersant, and a solvent. In this process, the used amount of ultra-fine pigment particles is in the range of 0.05-30 parts by weight, optimally 0.1-10 parts by weight, with respect to 100 parts by weight of a phosphor. When the used amount of ultra-fine pigment particles is less than 0.05 parts by weight, contrast reduces. On the other hand, when the used amount of ultra-fine pigment particles exceeds 30 parts by weight, brightness decreases. The average particle diameter of the pigment particles is optimally in the range of 10-300 nm because transmission of light generated by the phosphor is less reduced when the particle diameter of the pigment lies within this range.

Examples of the ultra-fine pigment include $TiO_2$—CoO—NiO—$ZrO_2$, $Fe_2O_3$, and CoO—$Al_2O_3$. The used amount of the ultra-fine pigment is in the range of 0.05-30 parts by weight with respect to 100 parts by weight of the phosphor used. In particular, the amount of a pigment, such as a yellow pigment, green pigment, etc., used for forming a green phosphor layer, may be in the range of 0.05-10 parts by weight with respect to 100 parts by weight of the green phosphor used. The amount of a pigment, such as a blue pigment, used for forming a blue phosphor layer may be in the range of 0.05-10 parts by weight with respect to 100 parts by weight of the blue phosphor used. The amount of a pigment, such as a red pigment, used for forming a red phosphor layer may be in the range of 0.05-20 parts by weight with respect to 100 parts by weight of the red phosphor used.

In making the pigment dispersion, any kind of a solvent can be used as long as the solvent allows the pigment to disperse therein. Examples of the solvent include diethylene glycol, triethylene glycol, and the like. The amount of the solvent used is optimally in the range of 30-40 parts by weight with respect to 100 parts by weight of pigment used.

In making the pigment dispersion, a dispersant is used. The dispersant disperses the pigment in the solvent. Examples of the dispersant include sodium citrate, C2-C30 sodium alkylcarboxylate, and naphthalenedicarboxylic acid disodium which are all anionic surfactants. The used amount of the dispersant is optimally in the range of 0.5-6 parts by weight with respect to 100 parts by weight of the pigment used.

Next, a composition for forming a phosphor layer is prepared by mixing the pigment dispersion with a phosphor, a photosensitizer, and a binder. Examples of the photosensitizer include dichromate compounds, such as sodium dichromate, ammonium dichromate, etc., and a diazo salt. The optimal amount of the photosensitizer used maybe in the range of 0.001-0.2 parts by weight with respect to 100 parts by weight of the phosphor used. If the amount of the photosensitizer does not lie within this range, it is difficult to form a layer pattern as intended.

In order to form the phosphor layer using the pigment dispersion, a binder is used. An example of the binder includes polyvinyl alcohol. Optimally, the used amount of the binder may be in the range of 0.01-0.3 parts by weight with respect to 100 parts by weight of the phosphor used. If the amount of the binder does not lie within this range, the adhesion of the phosphor layer to a panel glass or substrate or faceplate is poor.

In order to form the phosphor layer, any kind of a commonly used phosphor can be used. Specifically, $Y_2O_2S$:Eu may be used to make a red phosphor, ZnS:Ag, Cl may be used to make a blue phosphor, and ZnS:Cu, Al may be used to make a green phosphor.

After the composition for forming a phosphor layer is coated over an upper (or inner) surface of a substrate of a cathode ray tube, the phosphor layer is patterned. One method of patterning the phosphor layer is by exposing and developing the coated phosphor layer using a photo mask. The photosensitizer in the phosphor layer enables this method of exposing and developing of the phosphor layer possible.

Although red, green, and blue phosphor layers can be formed in an arbitrary order on the substrate or faceplate without limitations, it is preferable to first form the green phosphor layer on the substrate, then to form the blue phosphor layer after formation of the green phosphor layer and then the red phosphor layer is formed after the blue phosphor layer is formed, taking recovery of phosphors into consideration. In no way is this invention limited to the above exact order of 3 formation of the colored phosphor layers.

In an alternative embodiment, instead of forming the above pigment dispersion, a pigment in the form of powder can instead be used and be mixed with the phosphor, the binder, and the photosensitizer to form a composition for forming a phosphor layer. By using the pigment powder, the steps of mixing in the solvent and the dispersant are thus avoided.

In addition to the above, it is to be appreciated that the order of adding the components to make the pigment dispersion and the phosphor component are not in any way limited to the above order, and that other orders of adding the ingredients may also work.

In an alternative to the exposure and the developing of the phosphor coatings, the phosphor layer may instead be formed using a printing method. When printing method is used for patterning and not the exposure and development methods, a composition for forming a phosphor layer prepared in paste form through concentration adjustment is used, and then a phosphor layer is formed by printing the composition for forming a phosphor layer.

Figure 3:
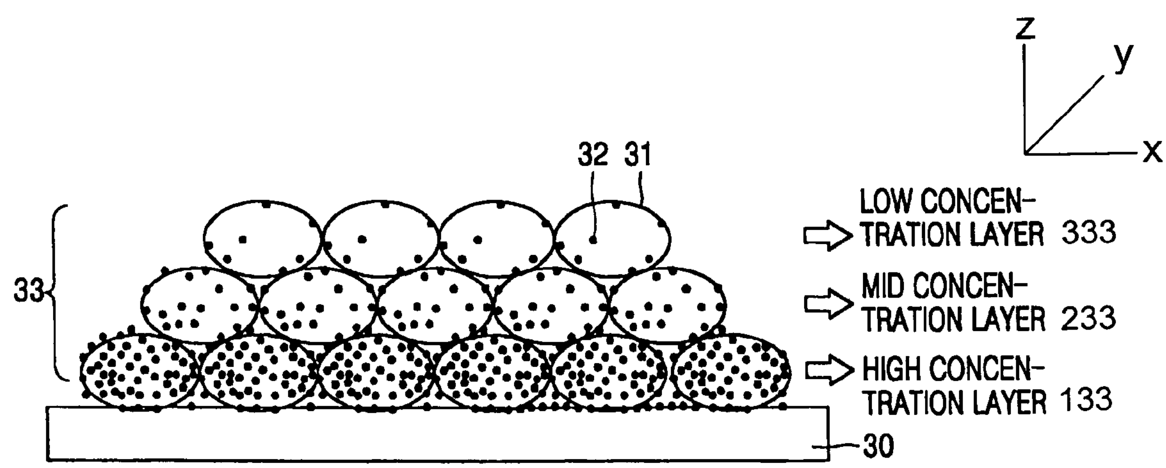
FIG. 3 is a sectional view illustrating a structure of a phosphor layer in accordance with the principles of the present invention.

Turning now to FIG. 3, FIG. 3 illustrates a phosphor layer according to the present invention. As illustrated in FIG. 3, a phosphor layer 33 is formed over an upper surface of a faceplate 30. Phosphor layer 33 is made up of three separate sublayers, 133, 233 and 333 formed sequentially on faceplate 30. Each of these three phosphor sublayers has pigment particles 32 and phosphor. Although the concentration of the pigment in each phosphor sublayer is uniform, the concentration of the pigment between the sublayers differs. In the present invention, it is preferred that the pigment concentration decreases for each subsequent sublayer applied to the faceplate 30. In other words, the pigment concentration decreases with each sublayer that is sequentially applied to the faceplate 30. This is why it can be said that the pigment concentration has a gradient in the direction perpendicular to the faceplate 30 in the z-direction. However, since the pigment concentration within each individual sublayer is constant, it can also be said that the pigment concentration decreases in a stepwise fashion in the z-direction.

Sublayers 133, 233 and 333 are all phosphor sublayers of a single primary color with each sublayer having a different pigment content or pigment concentration. For example, when a red pigment is used for forming a red phosphor layer, a deep red phosphor sublayer 133 having a high red pigment concentration, a medium red phosphor sublayer 233 having a mid-level red 11 pigment concentration layer and a pale red phosphor sublayer 333 having a low red pigment concentration layer are sequentially formed on faceplate 30. Thus, FIG. 3 represents a phosphor layer 33 of a single primary color as each of sublayers 133, 233 and 333 in FIG. 3 contain pigment of the same primary color but in different concentrations. Layers 133, 233 and 333 are referred to as "sublayers" to distinguish from layer 33 in FIG. 3. It is to be appreciated that the layered structure of the phosphor layer 33 can be empirically confirmed using transmission electron microscopy (TEM), a fluorescence spectrometry, etc.

In addition to each phosphor layer for a primary color being made up of preferably three sublayers having different pigment concentrations, it is preferable that a green phosphor layer is first formed on the faceplate, the blue layer is formed after the green layer is formed and the red layer is formed after the blue phosphor layer is formed, but in no way is the present invention limited to this exact order. It is preferable that each of these three different phosphor layers of different primary colors is made out of three sublayers of the same primary color with different pigment concentrations, but in no way is this invention limited thereto.

Figure 4:
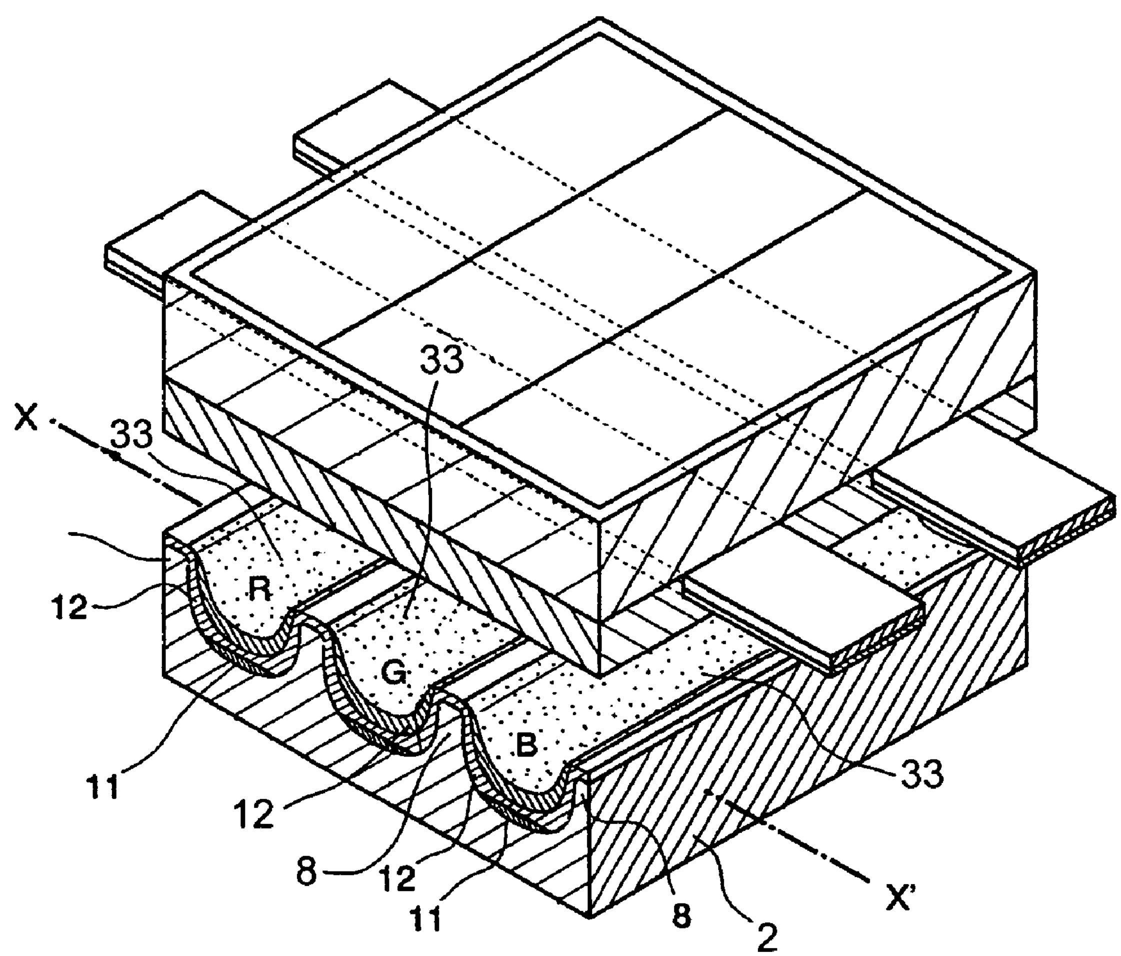
FIG. 4 illustrates a display having separate discharge cells for phosphors of different colors.

Turning now to FIG. 4, FIG. 4 illustrates one possible embodiment of a faceplate 2 having discharge cells formed therein between barrier ribs 8. In different discharge cells, phosphor layers of differing primary colors are formed within each discharge cell. As is clearly seen in FIG. 4, the red, blue and green phosphor layers 33 (R, B and G illustrated in FIG. 4) are all separated from each other. Thus, when the green, blue and red phosphor layers are deposited and patterned, phosphor layers of different colors to not mix and do not come into contact with each other. Therefore, it is to be appreciated that even if the green phosphor layer is first deposited on the faceplate and patterned before the depositing and patterning of the blue and the red phosphor layers, it is to be appreciated that the phosphor layers for each color are separated from phosphor layers of other colors by the patterning and developing or by the printing.

Although the phosphor layers in FIG. 4 are shown to be within discharge cells in the faceplate, in no way is this invention limited thereto. For example, the phosphor layers can be deposited on a flat faceplate, so long as after patterning, the phosphor sublayers of different colors do not mix or contact one another.

Figure 5A:
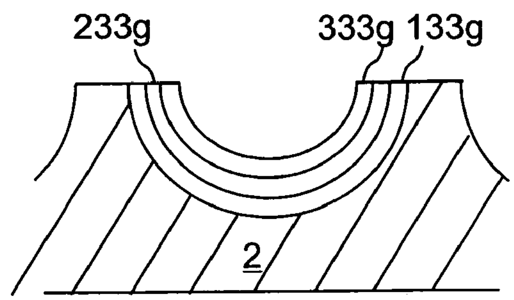
FIGS. 5A, 5B and 5C illustrate cross sections of green, blue and red discharge cells respectively taken in the X-X' direction of FIG. 4.
Figure 5B:
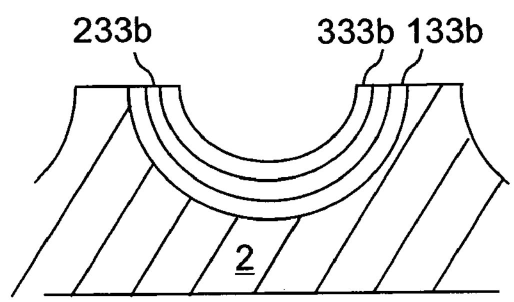
Figure 5C:
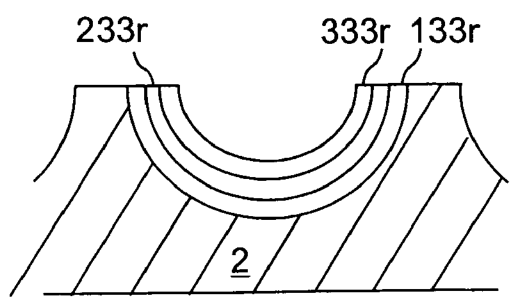

Turning now to FIGS. 5A, 5B and 5C, these figures illustrate the cross sectional views of FIG. 4 taken along X-X' and showing views of different discharge cells of different colors of phosphor. FIG. 5A is a cross section of a green (G) discharge cell containing a plurality of green phosphor sublayers 133g, 233g and 333g. FIG. 5B is a cross section of a blue (B) discharge cell containing a plurality of blue phosphor sublayers *133b*, *233b* and 333*b*. FIG. SC is a cross section of a red (R) discharge cell containing a plurality of red phosphor sublayers 133*r*, 233*r* and 333*r*. As is illustrated in these figures, the phosphor layers for each color are preferably made out of a plurality of sublayers, each sublayer with a differing pigment concentration. It is also to be appreciated in these figures that the phosphor sublayers of one color do not mix or contact phosphor sublayers of another color. Although three sublayers are illustrated, in no way is this invention limited thereto. Further, the number of sublayers can very for different colors of phosphors.

It is also to be appreciated that the phosphor layer according to the present invention is not limited just to CRT displays but can also be used in various image display devices, such as a plasma display panel, a field emission display, and an organic electroluminescent device, in addition to in a CRT.

The present invention will be described in greater detail with reference to the following examples. The following examples are for illustrative purposes and are not intended to limit the scope of the present invention.

EXAMPLE 1

A green pigment dispersion was prepared by mixing 10 g of pigment $TiO_2$—CoO—NiO—$ZrO_2$ having an average particle diameter of 30 nm, 100 g of pure water and 5 g of diethylene glycol as a solvent, and 0.4 g of sodium alkylcarboxylate as a dispersant, adding 400 g of 1-mm diameter glass balls to the mixture, and then ball milling the mixture at 120 rpm for 2 days. A red pigment dispersion and a blue pigment dispersion were prepared in the same manner as above using 10 g of CoO—$Al_2O_3$ having an average particle diameter of 20 nm and 5 g of $Fe_2O_3$ having an average particle diameter of 30 nm as pigments, respectively for the red and the blue pigment dispersions.

A composition for forming a green phosphor layer was prepared by mixing 10 g of the green pigment dispersion with 100 g of a green phosphor ZnS:Cu, Al, 80 g of polyvinyl alcohol, 110 g of pure water, 8 g of sodium dichromate, 2 g of a 5% propylene oxide-ethylene oxide copolymer solution (surfactant), 2 g of a 5% sorbitan monolaurate solution, and 5 g of a 5% sodium alkylcarboxylate solution. A composition for forming a blue phosphor layer was prepared in the same manner as above except that 40 g of the blue pigment dispersion and 100 g of a blue phosphor ZnS:Ag, Cl were used instead of the green pigment dispersion and the green phosphor. A composition for forming a red phosphor layer was prepared in the same manner as above except that 15 g of the red pigment dispersion and 100 g of a red phosphor $Y_2O_2S$:Eu were used instead of the green pigment dispersion and the green phosphor.

After the composition for forming a green phosphor layer was coated over an upper surface of a CRT panel containing a patterned black matrix layer, a patterned green phosphor layer was formed by exposing and developing a predetermined area of the coated surface using a photo mask. After the composition for forming a blue phosphor layer was coated over the surface of the CRT panel already coated and patterned with the green phosphor layer, a patterned blue phosphor layer was formed by exposing and developing a predetermined area of the coated surface. After the composition for forming a red phosphor layer was coated over the surface of the CRT already coated and patterned with the blue phosphor layer, a patterned red phosphor layer was formed by exposing and developing a predetermined area of the coated surface.

EXAMPLES 2-4

In examples 2, 3 and 4, blue phosphor layers were formed in the same manner as in Example 1, except that the amount of the blue pigment used in the preparation of the blue pigment dispersion was varied to 20 g, 40 g, and 60 g, respectively.

EXAMPLES 5-6

Red phosphor layers were formed in the same manner as in Example 1, except that the amount of $CoO—Al_2O_3$ used in the preparation of the red pigment dispersion was varied to 8 g and 20 g, respectively.

COMPARATIVE EXAMPLE X

Phosphor slurries were prepared by mixing red phosphor $Y_2O_2S$:Eu and green phosphor ZnS:Cu,Al to which 0.3 parts by weight of pigments with respect to 100 parts by weight of the phosphors were added, and a blue phosphor (ZnS:Ag, Cl) to which 4 parts by weight of a pigment with respect to 100 parts by weight the phosphor was added, respectively, with 120 g of water, 80 g of polyvinyl alcohol, 7 g of 10% sodium dichromate, 2 g of 5% ethylene oxide—propylene oxide copolymer solution, and 2 g of a 5% sorbitan monolaurate solution and stirring the mixtures for about 5 hours.

Coating the green phosphor slurry on an upper surface of a CRT panel was followed by exposure and developing processes to form a patterned green phosphor layer. A patterned blue phosphor layer and a patterned red phosphor layer were formed in the same manner as above using the blue phosphor slurry and the red phosphor slurry, respectively, instead of the green phosphor slurry.

Table 1 empirically illustrates brightness and contrast characteristics of the blue phosphor layers formed in accordance with Examples 1 through 4 and Comparative Example 1. Table 2 empirically illustrates brightness and contrast characteristics of the red phosphor layer formed in accordance with Examples 1, 5, and 6, and Comparative Example 1.

TABLE 1

| Example | The amount of blue pigment with respect to 100 parts by weight of phosphor | Brightness (%) | Contrast (%) |
|---|---|---|---|
| Comparative Example X | — | 100 | 100 |
| Example 1 | 0.5 | 103 | 105 |
| Example 2 | 1.5 | 99 | 113 |
| Example 3 | 3 | 97 | 122 |
| Example 4 | 4 | 95 | 128 |

TABLE 2

| Example | The amount of red pigment with respect to 100 parts by weight of phosphor | Brightness (%) | Contrast (%) |
|---|---|---|---|
| Comparative Example X | — | 100 | 100 |
| Example 1 | 0.1 | 98 | 110 |
| Example 5 | 0.2 | 92 | 123 |
| Example 6 | 0.3 | 88 | 132 |

As is illustrated Tables 1 and 2, the blue phosphor layers of Examples 1 through 4 and the red phosphor layers of Examples 1, 5, and 6 illustrate improved contrast without requiring additional processes, compared to the blue phosphor layer and the red phosphor layer of Comparative Example X, which were manufactured using the pigment-added phosphors. The phosphor layer of Example 1 has better brightness than the phosphor layer of Comparative Example X. The phosphor layers of Examples 2 through 6 had satisfactory brightness for use in CRTs, although they are slightly lower than the brightness using the phosphor layer manufactured using the pigment-added phosphors in Comparative Example X. A method of manufacturing a phosphor layer according to the present invention is based on phosphor layer manufacturing processes and includes a reduced number of processing steps compared to a filter screen method, thereby lowering the manufacturing costs. A phosphor layer manufacturing using the method has improved brightness and contrast characteristics. The phosphor layer according to the present invention can be used in display devices such as CRTs, plasma display panels, and field emission displays.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A phosphor layer on a faceplate, the phosphor layer comprising:

an ultra-fine pigment;

a dispersant;

a phosphor;

a photosensitizer: and a binder, wherein the phosphor has a uniform concentration distribution along a thickness of the phosphor layer, and the pigment has a concentration gradient in a thickness direction, and an amount of the ultra-fine pigment is in the range of 0.05-20-parts by weight with respect to 100 parts by weight of the phosphor, the ultra-fine pigment has an average particle diameter ranging from 10 nm to 300 nm, the ultra-fine pigment is comprised of a material selected from a group consisting of $TiO_2—CoO—NiO—ZrO_2$, $Fe_2O_3$, and $CoO—Al_2O_3$.

2. A display device comprising the phosphor layer of claim 1, wherein the ultra-fine pigment has an average particle diameter ranging from 10 nm to 300 nm, wherein the ultra-fine pigment is comprised of a material selected from a group consisting of $TiO_2—CoO—NiO—ZrO_2$, $Fe_2O_3$, and $CoO—Al_2O_3$.

3. A phosphor layer on a faceplate, the phosphor layer comprising:

an ultra-fine pigment;

a dispersant;

a phosphor;

a photosensitizer; and a binder, wherein the phosphor has a uniform concentration distribution along a thickness of the phosphor layer, and the pigment has a concentration gradient in a thickness direction, the ultra-fine pigment is comprised of a material selected from a group consisting of $TiO_2—CoO—NiO—ZrO_2$,$Fe_2O_3$ and $CoO—Al_2O_3$.

4. The phosphor layer of claim 3, an amount of the ultra-fine pigment is in the range of 0.05-30 parts by weight with respect to 100 parts by weight of the phosphor.

5. The phosphor layer of claim 3, the ultra-fine pigment has an average particle diameter ranging from 10 nm to 300 nm.

6. A display device comprising the phosphor layer of claim 3.

7. The display device of claim 6, wherein an amount of the ultra- fine pigment is in the range of 0.05-30 parts by weight with respect to 100 parts by weight of the phosphor.

8. The display device of claim 6, the ultra-fine pigment has an average particle diameter ranging from 10 nm to 300 nm.

* * * * *